(12) United States Patent
Ludwig et al.

(10) Patent No.: US 8,477,608 B2
(45) Date of Patent: Jul. 2, 2013

(54) METHOD AND RECEIVER FOR CONTROLLING THE CONFORMANCE OF A DATA FLOW IN A COMMUNICATION SYSTEM TO A TRAFFIC DEFINITION

(75) Inventors: Reiner Ludwig, Hürtgenwald (DE); Mats Sagfors, Kyrkslätt (FI); Hannes Ekstrom, Stockholm (SE)

(73) Assignee: Unwired Planet, LLC, Reno, NV (US)

( * ) Notice: Subject to any disclaimer, the term of this patent is extended or adjusted under 35 U.S.C. 154(b) by 0 days.

(21) Appl. No.: 12/447,109

(22) PCT Filed: Oct. 26, 2006

(86) PCT No.: PCT/EP2006/067809
§ 371 (c)(1),
(2), (4) Date: Oct. 12, 2009

(87) PCT Pub. No.: WO2008/049462
PCT Pub. Date: May 2, 2008

(65) Prior Publication Data
US 2010/0046374 A1    Feb. 25, 2010

(51) Int. Cl.
*G01R 31/08* (2006.01)
*G06F 11/00* (2006.01)

(52) U.S. Cl.
USPC ............................. 370/230; 370/236

(58) Field of Classification Search
USPC .............. 370/468, 230, 236; 455/450; 726/23
See application file for complete search history.

(56) References Cited

U.S. PATENT DOCUMENTS

| | | |
|---|---|---|
| 4,839,891 A | 6/1989 | Kobayashi et al. |
| 6,560,243 B1 | 5/2003 | Mogul |
| 6,603,975 B1* | 8/2003 | Inouchi et al. ............. 455/450 |
| 6,894,974 B1 | 5/2005 | Aweva et al. |
| 6,990,070 B1 | 1/2006 | Aweya et al. |
| 7,068,606 B1 | 6/2006 | Ma et al. |
| 7,102,998 B1 | 9/2006 | Golestani |
| 7,457,313 B2* | 11/2008 | Patrick ........................ 370/468 |
| 2005/0041586 A1 | 2/2005 | Jiang |
| 2008/0028467 A1* | 1/2008 | Kommareddy et al. ........ 726/23 |

FOREIGN PATENT DOCUMENTS

| | | |
|---|---|---|
| EP | 0 948 168 A | 10/1999 |
| EP | 0 991 244 A2 | 4/2000 |
| WO | WO 99/04536 A1 | 1/1999 |
| WO | WO 00/57666 A1 | 9/2000 |
| WO | WO 2004/091151 A | 10/2004 |

* cited by examiner

*Primary Examiner* — Mark Rinehart
*Assistant Examiner* — Gbemileke Onamuti
(74) *Attorney, Agent, or Firm* — Nixon & Vanderhye, P.C.

(57) ABSTRACT

A method is described for controlling the conformance of a data flow in a communication system to a traffic definition. The communication system comprises a transmitter and a receiver and data packets transporting the data flow are sent from the transmitter to the receiver. The receiver sends responses identifying received data packets to the transmitter, and the transmitter comprises a control function which controls the number of sent data packets for which no response is received according to a limit for the number of outstanding data packets. A conditioning criterion is obtained for the data flow, the conditioning criterion being associated with the traffic definition. The receiver determines a conformance parameter for the received data packets transporting the data flow. The limit and/or the sending of the responses is modified according to the conditioning criterion and the determined conformance parameter for controlling the number of transmitted data packets.

21 Claims, 4 Drawing Sheets

METHOD AND RECEIVER FOR CONTROLLING THE CONFORMANCE OF A DATA FLOW IN A COMMUNICATION SYSTEM TO A TRAFFIC DEFINITION

TECHNICAL FIELD

The present invention relates to a method for controlling the conformance of a data flow in a communication system to a traffic definition, wherein the communication system comprises a transmitter and a receiver and data packets transporting the data flow are sent from the transmitter to the receiver. A receiver and a software program embodying the invention are also described.

BACKGROUND

The transmission capacity of communication systems is limited due to the available resources for transmission. For example, the air interface between mobile user equipment and the access node of a radio communication system has only a limited bandwidth which has to be shared by the users of the communication system. For this reason, many communication systems comprise functions for access restriction to avoid congestion by additional traffic entering the communication system, for policing or shaping ongoing traffic to ensure the conformance of the traffic with traffic definitions, and for scheduling of the traffic to share the available resources between the users. Traffic conditioning is used throughout the text as generic term for shaping and policing. The conditioning can comprise buffering, marking and/or dropping of the traffic.

These functions often control the traffic according to parameters which are specific for the subscription of a user, for example a specified quality of service, especially with respect to the bit rate for the user. In other words, operators may choose to offer different qualities of service (QoS) depending on the user's subscription, i.e. they may choose to perform user differentiation. Depending on the type of traffic, the requirements for the transmission can differ significantly. For example, voice transmission requires low delay and jitter while a limited amount of errors can be acceptable while file transfer typically requires error-free data but allows for jitter. As a result, also traffic differentiation may be required. For providing user and traffic differentiation, a defined quality of service is an important concept in the control of data traffic as described for example in technical specification 3GPP 23.107 V 6.4.0. of the $3^{rd}$ Generation Partnership Project "Quality of Service (QoS) concept and architecture".

The traffic consists of data packets sent between the user equipment and the communication system. The user equipment and the nodes of the communication system typically have a layered protocol stack with a plurality of protocol layers, the data packets corresponding to a specific layer in the protocol stack. For the transmission, the data packets may be processed into data units of an underlying layer in the protocol stack. Such processing can comprise for example segmentation, concatenation, or padding of data packets, or adding of headers or checksums to them, or any combinations of such processing. Similarly, the data packets may carry data of a higher layer in the protocol stack.

The quality of service relating to a data transmission involving nodes of a mobile communication system and a user equipment is defined in different contexts. The user equipment and a core network node of the communication system can negotiate a PDP (Packet Data Protocol) context which specifies parameters for the transmission of data packets to and from the user equipment. Further contexts can be set up for different links of the data transmission, e.g. a radio bearer between an access node and the user equipment, which specifies the transmission parameters on the radio link. The parameters of the further contexts are normally determined according to the PDP context. Packet flows to and from the user equipment are then mapped to these contexts and forwarded accordingly by the scheduling and traffic conditioning functions.

In recent developments of mobile access systems, the scheduling function is moved closer to the air interface in order to allow higher data rates and faster responses. In a mobile communication system, for example in a UMTS system (Universal Mobile Telecommunication System) according to 3GPP ($3^{rd}$ Generation Partnership Project) specifications, the radio resources are thus preferably scheduled in the Radio Base Station (RBS or Node B). Fast scheduling in the Node B allows for quick resource allocation and re-allocation of resources between users. One scheduling strategy is to time-multiplex different users, so that one user or selected users are allowed to transmit at a high data rate at one time while the transmissions of other user are performed at another time. Advanced methods at the physical layer including e.g. channel dependent coding and modulation, higher order modulation schemes, or multiple input-multiple output (MIMO) together with wide spectrum bands means that the momentarily available bit-rates for each user can be very high.

However, if an operator of a communication system offers differently priced subscriptions with different quality of service, in particular with different data rates, the bit-rate is also constrained by a subscription maximum bit-rate (MBR). Similar subscriptions are already today offered by many fixed broadband (e.g. DSL) operators. Correspondingly, if the maximum bit-rate of the subscription is exceeded the user should not be allowed to use the momentarily available bit-rate, which is for a mobile communication system typically limited by the air interface. For this purpose, a traffic conditioning function can constrain the maximum bit-rate to a value below the bit-rate provided by the physical layer. A further need for a traffic conditioning function exists if the user equipment can use bearers with different Quality of Service (QoS): An application should not be allowed to misuse a bearer that has been allocated to support a certain maximum bit-rate. In both cases, the traffic conditioning function should ensure that the MBR is not exceeded.

A traffic conditioning function can be implemented using a token bucket algorithm. In this case, the bit-rate may momentarily exceed the MBR but must not exceed it on average. The allowed traffic pattern, especially burst-sizes, is specified by the parameters of the algorithm. Traffic exceeding the specified criteria is queued or dropped according to the specific implementation. An example of traffic conditioning is described in 3GPP TS 23.107 V6.4.0. The token bucket algorithm in this example is defined by the desired asymptotic, i.e. long term, maximum rate and the upper bound of the burst-size that is conforming to the conditioning criteria. Packets conforming to the traffic definition represented by the conditioning criteria are forwarded while non-compliant packets may trigger a shaping, marking or policing of the traffic.

While policing and scheduling of traffic in the downlink to the user equipment is already specified in present 3GPP specifications, the conditioning of uplink traffic from the user equipment to the radio access of the communication system still constitutes a problem. Conditioning traffic in the uplink from the user equipment to the radio network can be performed at different places all having specific disadvantages.

As a first option, traffic conditioning could be performed in the user equipment, for example in a mobile terminal as described in specification 23.107. The mobile terminal can ensure that the traffic is conforming to the conditioning criteria. However, specifications lack a detailed description of the algorithms that the user equipment should use to shape and police traffic. The methods used for conditioning and the traffic characteristics resulting from this traffic conditioning may thus differ substantially depending on the vendor of the user equipment. In addition, control by the user equipment may have the result that the conditioning function shapes or drops traffic in an undesirable manner. Furthermore, if an operator offers different QoS at different prices he also wants to be responsible for providing the QoS while the user equipment is often considered a non-trusted device. As a result, a network-controlled solution in which the network is responsible for the QoS and the conditioning function is preferred.

Alternatively, traffic conditioning may be performed in a network node controlling data traffic relating to the user equipment, for example in an RNC (Radio Network Controller), an SGSN (Serving GPRS Support Node), or a GGSN (Gateway GPRS Support Node). However, the respective conditioning function cannot immediately affect data traffic prior to this network node, e.g. over the wireless access link or the transport network. Resources used for the transmission of packets dropped by a network controlled policing function are thus wasted which is especially undesirable for the wireless link on the air interface.

A further possibility for constraining the data rate in the uplink is to limit the available transport block sizes available to the user equipment using radio resource configuration by an RNC, or scheduling restrictions in the Node B. However, such restrictions may unnecessarily limit the momentary bit rate and the opportunities to time-multiplex users so that the gains from link-dependent scheduling could potentially be lost. Sending multiple small blocks instead of fewer large blocks is typically also associated with a larger transmission overhead.

Uplink traffic conditioning by the Node B scheduler could provide a still further means for controlling the MBR using scheduling grants, including also the freedom to dynamically assign time-varying grants. However, also this option has disadvantages. The scheduler in a Node B according to 3GPP specifications can assign grants per user equipment or per dedicated channel while present user equipment can only have one dedicated channel. The Node B has therefore limited means to control the rate of individual flows. For example, if a user equipment with multiple flows performs priority scheduling, the Node B scheduler cannot allow data of from a low-priority flow while at the same time restricting then maximum bit-rate of a higher-priority flow from the same user equipment. This disadvantage could be improved by changing the standards and allowing scheduling grant assignments to specific flows. However, this option would significantly increase the required signaling.

Accordingly, existing solutions for uplink traffic conditioning are equipped with a multitude of difficulties, drawbacks and/or lack of standard support.

SUMMARY

In view of the above disadvantages it is an object of the present invention to propose an improved method for controlling the conformance of a data flow in a communication system to a traffic definition.

According to the invention, the method described in claim 1 is performed. Furthermore, the invention is embodied in a receiver, a communication system and a program as described in the further independent claims.

The proposed method controls the conformance of a data flow in a communication system to a traffic definition. The communication system comprises a transmitter and a receiver and data packets transporting the data flow are sent from the transmitter to the receiver. The receiver sends responses identifying received data packets to the transmitter and the transmitter comprises a control function which controls the number of sent data packets for which no response is received according to a limit for the number of outstanding data packets.

In the method, a conditioning criterion for the data flow is obtained, the conditioning criterion being associated with the traffic definition. A conformance parameter for the received data packets transporting the data flow is determined at the receiver. The limit and/or the sending of the responses is modified according to the conditioning criterion and the determined conformance parameter for controlling the number of transmitted data packets.

A receiver for controlling the conformance of a data flow in a communication system to a traffic definition is also described. The receiver comprises an input unit to receive data packets transporting the data flow from a transmitter, an output unit adapted to send responses identifying received data packets to the transmitter, and a processing unit adapted to control the responses sent by the output unit. The processing unit is also adapted to obtain a conditioning criterion for the data flow, the conditioning criterion being associated with the traffic definition. The processing unit further comprises a determining function for determining a conformance parameter for the received data packets transporting the data flow, and a setting function for modifying a limit for a number of outstanding data packets and/or the sending of the responses according to the conditioning criterion and the determined conformance parameter for controlling the number of transmitted data packets. The receiver can be adapted to any embodiments of the method. The receiver functions can for example be embodied as software executed in the processing system.

Furthermore, a program is described for controlling the conformance of a data flow in a communication system to a traffic definition when executed in the processing unit of a receiver of a communication system. The receiver comprises an input unit to receive data packets transporting the data flow from a transmitter, an output unit adapted to send responses identifying received data packets to the transmitter, the processing unit being adapted to control the responses sent by the output unit. The program comprises code for performing the steps of obtaining a conditioning criterion for the data flow, the conditioning criterion being associated with the traffic definition, determining a conformance parameter for the received data packets transporting the data flow, and modifying a limit for a number of outstanding data packets and/or the sending of the responses according to the conditioning criterion and the determined conformance parameter for controlling the number of transmitted data packets.

A program unit according to the invention is for example stored on a data carrier or loadable into a processing system of a receiver, e.g. as a sequence of signals.

The foregoing and other objects, features and advantages of the present invention will become more apparent in the following detailed description of embodiments as illustrated in the accompanying drawings.

DETAILED DESCRIPTION

Figure 1:
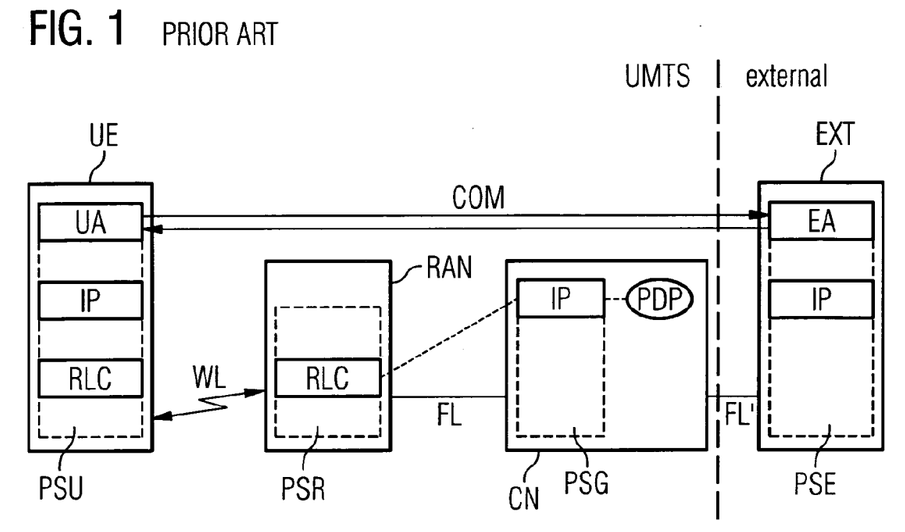
FIG. 1 shows a communication system in which the proposed method is applicable

FIG. 1 shows an example of a communication system in which the proposed method can be used, comprising as subsystems a UMTS mobile communication system and an external communication system. In the example, an application UA executed in a user equipment UE in the UMTS mobile system is in communication COM with an application EA executed in a device EXT in the external network, e.g. an Internet server. The communication is performed using data packets which are sent over different intermediate nodes, in the example radio access network nodes RAN and core network nodes CN. While only one node of each group is indicated for clarity, a skilled person is aware that customary mobile networks comprise a core network with a plurality of core network nodes, e.g. a serving general packet radio service support node (SGSN) and a gateway general packet radio service support node (GGSN). The core network nodes allow the exchange of data with external networks such as the Internet or mobile or fixed networks of other operators. Furthermore, customary radio access networks comprise different access network nodes for the radio transmission to the user equipment, commonly designated, e.g., as radio network controllers (RNC) or Node B. However, this split of functionality between the radio access nodes and the core nodes is not essential to the present invention.

Each device comprises at least one protocol stack PSU, PSR, PSG, PSE processing the data packets of the communication. The protocol stacks may have different numbers of protocol layers. Especially many intermediate devices may not be adapted to process the highest layers indicated like the application layer. Devices with different types of links towards different nodes, e.g. a wireless link WL and a fixed link FL, or fixed links FL, FL' with different properties, generally comprise a different stack for each type of link although this detail is also omitted in the figures for clarity. Only some of the protocol layers in the respective stacks are indicated. The wireless link WL between the user equipment and the radio access network is controlled by an RLC (Radio Link Control) layer. Different instances within the RLC layer are associated with different logical channels between user equipment and radio access network.

A customary transport protocol is IP (Internet Protocol) as indicated in the user equipment UE, the core network node CN and the external device EXT. The IP address for the user equipment is associated with a PDP context which defines the quality of service for the bearers in the mobile communication system. Generally, the PDP context is also associated with a specific RLC instance as contexts relating to the bearers in the radio access network are defined in dependence on the PDP context.

The proposed method is suitable for controlling the conformance of a data flow in a communication system to a traffic definition, e.g. an agreed data rate of the data flow. The method is especially suited for a mobile communication system with a wireless link between a transmitter and a receiver although it is applicable to other communication systems as well. It should be noted that the receiver is in many cases not the ultimate destination of the traffic carried by the flow but terminates the protocol in which the data packets are sent, e.g. an RLC receiver for RLC packets.

A data flow is often defined by the origin and the destination of the corresponding data units and the protocol used. For example an IP data flow is usually defined by 5 parameters, i.e. source and destination addresses, source and destination port numbers and protocol identification. In the present text, however, the term flow is used in a more general meaning and can comprise all data packets of a given protocol layer which are either sent to the same destination or by the same source using a common control instance, i.e. all packets with a common endpoint in the given protocol layer. A flow can thus be defined only by a subset of the above parameters and may correspondingly comprise a plurality of IP flows. For a mobile communication system, a flow can comprise for example all traffic which is related to the same PDP context, logical channel or radio access bearer. An example of a suitable control instance in this case is thus an RLC instance as defined in the 3GPP specifications and described with respect to FIG. 1. Due to the processing in the protocol stack, the data of the flow is sent using the data packets of lower layers. The lower-layer data packets are thus associated with the respective data flow, even if the data flow is defined on a different protocol layer. In particular, the control instance may be part of a lower protocol layer as in the above example, where the PDP context is associated with an IP address while the RLC instances control the underlying link layer in the protocol stack.

Data packets transporting the data flow are transmitted from the transmitter to the receiver and the receiver sends responses identifying received data packets to the transmitter. An example for a response is an acknowledgement. Typically, data packets are identified by a sequence number and the responses indicate the sequence numbers of received data packets or the next expected data packet. Cumulative acknowledgements identifying a plurality of data packets are also possible. If the transmission is performed in an acknowledged mode, a memory in the transmitter preferably stores the sent data packets for an optional retransmission until an acknowledgement confirms successful reception by the receiver. It is however also possible to use the proposed method in an unacknowledged mode, for example if responses identify the highest sequence number of the received packets without requesting them for retransmission.

The transmitter in the proposed method comprises a control function for the transmission, which controls the number of sent data packets for which no response is received according to a limit for the number of outstanding data packets. Outstanding data packets are packets which are sent to the receiver but for which a response is not yet received, for example unacknowledged packets. The transmitter may comprise a transmitter window which identifies outstanding data packets. In this embodiment, the limit corresponds to the maximum number of data packets identified in the transmitter window.

At least one conditioning criterion for the data flow is obtained, for example by a control function which may be implemented as software in a processing unit of the receiver. The conditioning criterion is associated with the traffic definition. During transmission of the data packets, a conformance parameter like a measured data rate of received data packets transporting the data flow at the receiver is determined. For this purpose, the control function comprises an interface for obtaining the required information, e.g. the number of data packets received per interval of time and the size of the data packets. With this information, the conditioning criterion and the determined data rate are compared. The limit for the number of outstanding packets and/or the sending of the responses is modified according to the result of the comparison in order to control the number of transmitted data packets. A modification can be performed if the determined conformance parameter exceeds the conditioning criterion, for example if a measured data rate exceeds a maximum bit rate, or if the data rate meets the policy criterion again after a prior modification.

It should be noted that more than one conformance parameter can be checked against a conditioning criterion to determine if a modification shall be performed. It is also possible that a conformance parameter is checked against a combination of conditioning criteria. For example, a token bucket algorithm for controlling a data rate will trigger a modification in case of both excessive average data rate and excessive burst sizes. In this case, the conditioning criteria would correspond to the bucket size and token rate, such that the traffic is non-conformant if the bucket is empty, while the conformance parameter would correspond to the fill level of the token bucket.

The proposed method describes a traffic conditioning controlled by the receiver. It has the advantage that a waste of resources on the link between transmitter and receiver is avoided and no data packets that have been sent over the link between transmitter and receiver are lost due to the traffic conditioning. If the method is implemented in a receiver being part of the network, it can be fully controlled by the network, i.e. the operator. In this way, it is especially suitable for controlling the average data rate and burst sizes in the uplink for data transmitted from the user equipment to the communication system although it may also be used in the downlink to the user equipment. The method is simple and thus does not affect the performance of the receiver. Depending on the implementation, no or merely a small increase of control signaling between receiver and transmitter is required.

In an advantageous embodiment, the step of modifying comprises a message from the receiver to the transmitter for adapting the limit. Accordingly, the transmitter is instructed to decrease or increase the maximum number of outstanding, e.g. unacknowledged, data packets. In this way the traffic can either be limited for conforming to the traffic definition or the restrictions may be relaxed if the traffic would then still conform, e.g. the maximum data rate can be changed.

The step of modifying can also comprise an adaptation of a delay before sending a response, i.e. responses are not sent immediately after they are triggered by a reception surveillance function in the receiver but sent with an additional delay if the data rate shall be reduced. For an increase of the maximum data rate, the delay can be decreased or removed.

If responses adapted to identify a plurality of data packets are used, e.g. cumulative acknowledgements, the step of modifying can comprise also an adaptation of the number of data packets identified in a response. For example, the acknowledgement for a successfully received data packet can be sent in a later acknowledgement if the data rate shall be decreased.

It should be noted that the above options for controlling the number of transmitted data packets in line with the traffic definition can either be used alternatively or in any combination.

An advantageous conditioning criterion is a limit for a data rate and the conformance parameter is a measured data rate. Alternatively, a combination of suitable conditioning criteria are the parameters of a token bucket, where the token bucket is characterized by its size and the token rate. In the latter case, the conformance parameter is the fill level of the token bucket.

In an advantageous embodiment, the data flow consists of data units of an upper layer in a protocol stack, for example an IP data flow. The data packets transporting the data flow are data packets of an underlying layer in the protocol stack. This allows traffic conditioning also in units which forward the data traffic but do not process the upper protocol layer. Furthermore, data sent in a protocol without responses like for example a data stream using the user datagram protocol (UDP) can be conditioned if an underlying protocol with responses exists, e.g. an ARQ protocol. As a further advantage this embodiment allows it to easily control the flow in a common instance of the underlying layer which all packets of the flow have to pass if a single instance for controlling the flow in the upper layer does not exist or may require a more complicate mode of controlling.

Preferably, the data packets are data packets of a link layer on a communication link between the transmitter and the receiver. This allows to perform the traffic conditioning close to the transmitter and decrease the delay before the conditioning measures affect the traffic. This is of especial advantage in wireless systems with a relatively high round trip time.

The method is especially advantageous if the transmitter is a mobile user equipment and said receiver is a base station of a mobile communication system. For example, the method can be implemented for data packets of the RLC layer in a UMTS radio access network.

In a further embodiment of the method, a plurality of data flows is sent between the transmitter and the receiver. In this case, the steps of obtaining the conditioning criterion, determining the data rate and modifying are performed for each data flow individually. This allows a traffic conditioning per logical channel, i.e. different flows supported by the user equipment can be controlled independently.

If the size of the data packets is variable, the step of modifying is performed also in consideration of the size of the data packets. In this way, the method can also be applied to transmissions with variable packet size if the size of the packets is available to the control function determining the modification.

In a preferable embodiment, the above method is used to perform traffic conditioning, especially in the uplink, by controlling the transmitter window parameters in a window based Radio Link Control protocol in a UTRAN (UMTS Terrestrial Radio Access Network). The control can be performed using, e.g., the token bucket algorithm as defined in 3GPP TS 23.107. It can include control of responses sent in the downlink by controlling the pace or the content of cumulative acknowledgements in order to constrain the bit rate in the uplink. Alternatively, the uplink receiver can control the transmitter window size by using the RLC WINDOW superfield. Limiting the transmitter window size constrains the amount of data the transmitter can send, and thereby the bit-rate of the logical channel associated with the respective RLC instance.

In a sliding window ARQ (Automatic Repeat Request) protocol in the prior art, such as RLC, the transmitter is only allowed to have a certain number of unacknowledged data packets outstanding. According to the 3GPP protocol specification TS 25.322 V6.7.0 for RLC, the parameter VT(MS) defines the maximum number of unacknowledged RLC data packets, generally denoted as Protocol Data Units (PDU), the transmitter is allowed to have outstanding. VT(MS) is initialized to the value "Configured_Tx_Window_size" but the window size can be changed after initialization by the receiver of the PDUs using the WINDOW super field defined in TS 25.322.

Figure 2:
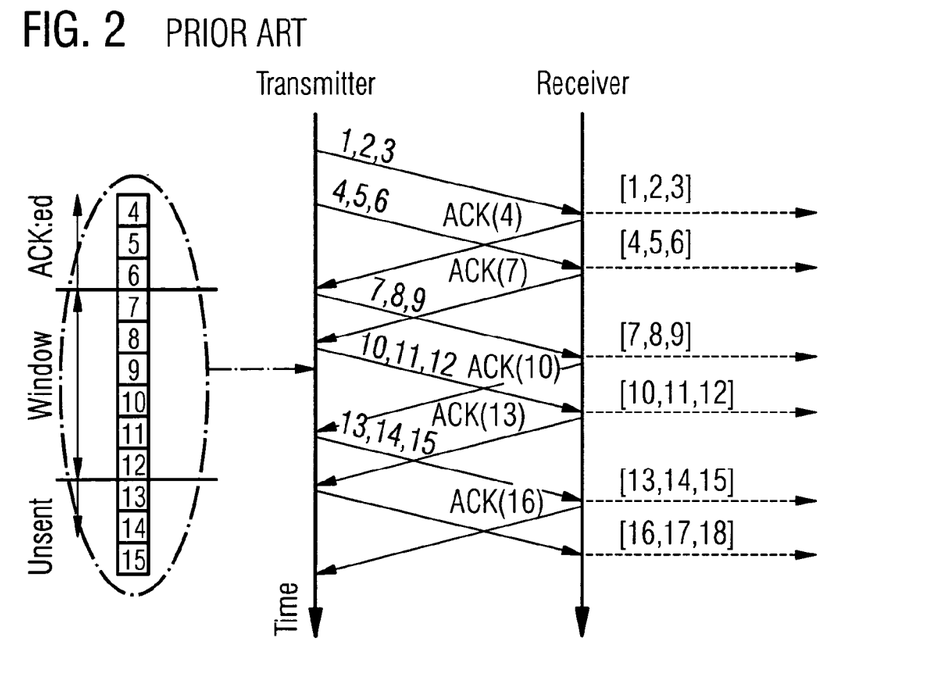
FIG. 2 shows the transmission of data packets in an ARQ protocol

The behavior of the sliding window is illustrated with the following example referring to FIG. 2. In an ARQ protocol, the receiver acknowledges received PDUs. The PDUs which are sent but not yet acknowledged are identified in the transmitter window. The identifications are stored in the window when a data unit is sent and removed from the window after a successful transmission to the receiver is acknowledged. In the example, the size of the window is limited to six PDUs. Consequently, the transmitter is allowed to have a maximum of six PDUs in flight, i.e. this is the maximum number of data packets which can be sent out without having received an acknowledgement of the reception. Upon reception of acknowledgements the transmitter can move the window and transmit additional PDUs.

As can be seen in FIG. 2, an ARQ sliding window protocol has a self-clocking property, i.e. the reception of acknowledgements limits the rate of data transmission. In this example, the transmitter first sends two bursts of data, e.g. in two transmission time intervals TTI, with packet numbers [1,2,3] and [4,5,6], respectively. Before sending additional PDUs, the transmitter has to wait for acknowledgements. In the example of RLC, cumulative acknowledgements are used which indicate the number of the next data packet expected by the receiver. Thus an acknowledgement comprising an identification of PDU number n indicates that all PDUs up to number n−1 are correctly received. Thus when the receiver acknowledges the first three PDUs with acknowledgement ACK(4), the transmitter is allowed to transmit another three PDUs. Additional acknowledgements from the receiver allow the transmitter to transmit additional PDUs, e.g. after reception of ACK(7) indicating the correct reception of all PDUs up to number 6 again three further PDUs can be transmitted.

The illustration on the left-hand side of FIG. 2 shows the status of the transmitter window at the time indicated by the dashed arrow. The right-hand side of the figure indicates the PDUs forwarded to the further processing in the receiver which may include reassembly and delivery to upper layers. Corresponding illustrations are also included in FIGS. 3-5 which indicate different embodiments of the present method.

In the proposed method, the rate of data reception, e.g. the number of PDUs, in the receiver is determined and compared by a conditioning function to at least one criterion, for example using a token bucket algorithm. In particular, the criterion can be an MBR. If the criterion is violated the acknowledgements are modified or delayed or a window parameter is adjusted to control the bit-rate of the flow.

Figure 3:
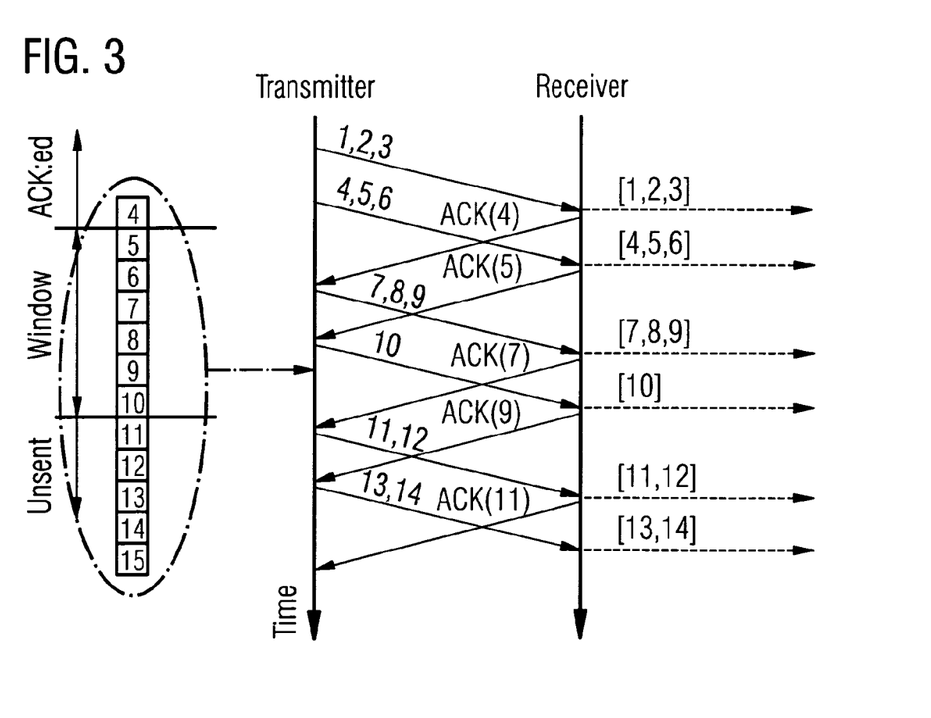
FIG. 3 shows a traffic conditioning in a first embodiment of the proposed method

In the first embodiment illustrated in FIG. 3 only a part of the successfully received data packets is acknowledged if a criterion is violated. By modifying acknowledgements of successfully received PDUs, the self-clocking property of the sliding window protocol is utilized to control the criterion, for example limit the MBR. In comparison to the example in FIG. 2, the number of received PDUs is reduced as a consequence of the modified responses.

When receiving the two groups of three PDUs each, the receiver determines a data rate and compares it to at least one conditioning criterion, using e.g. a token bucket algorithm. After reception of the first group with packets [1,2,3] the criterion is still fulfilled. As long as the conditioning criterion is fulfilled acknowledgements are sent out for all received data packets. However, after reception of the second group of packets, the receiver determines that the criterion is violated and acknowledges only a part of the received PDUs. Although the receiver has correctly received packets [4,5,6], it only sends acknowledgements up to PDU number 4 by sending ACK(5) in the figure while the correctly received PDUs 5 and 6 are not yet acknowledged. If the criterion is still violated when the next packets are received, the receiver similarly sends ACK(7) for confirming the reception of all data packets up to 6, even though packets 7, 8, and 9 have been received. This results in less PDUs being sent by the transmitter. The remaining acknowledgements are sent out when checks in the receiver determine that the conditioning criteria are again met. Thus the content of cumulative acknowledgements is constrained when conditioning criteria are violated.

Figure 4:
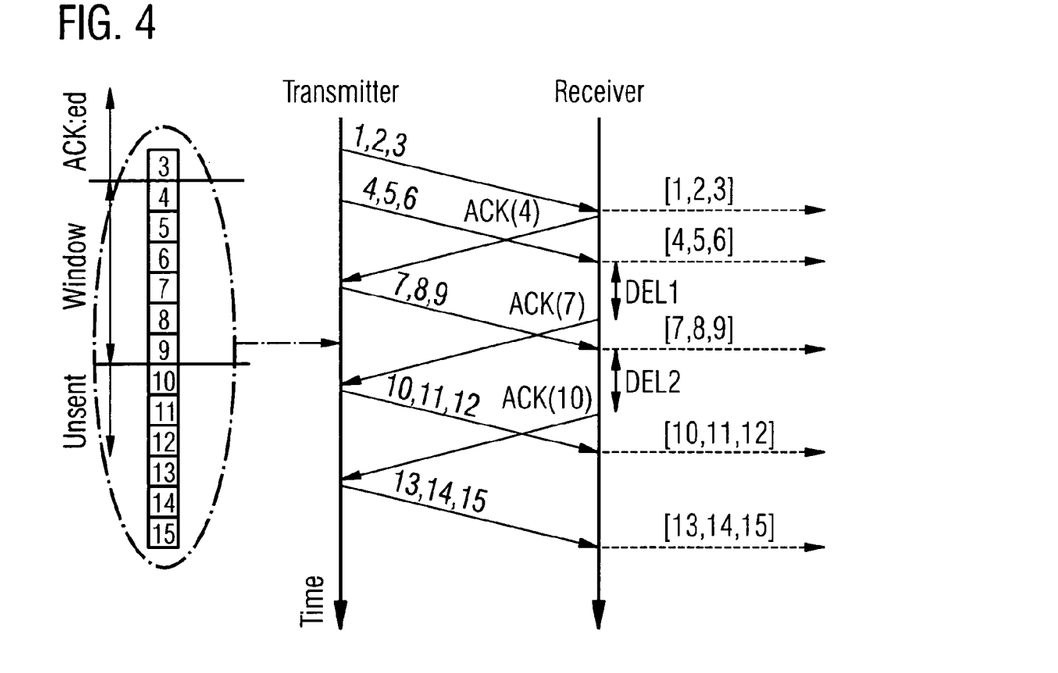
FIG. 4 shows a traffic conditioning in a second embodiment of the proposed method

Acknowledgements may also be delayed when a conditioning criterion is violated as illustrated in FIG. 4. This results again in a slower pace in the self-clocking mechanism of the sliding window protocol, and a lower bit-rate. The receiver determines conformance of the arriving data packets to at least one conditioning criterion, in the example the data rate of the received data packets. Initially, the data rate conforms to the conditioning criterion and all received data packets are immediately acknowledged. After receiving a second burst with 3 PDUs, the receiver determines that the traffic conditioning criterion is violated and delays the acknowledgement of the received PDUs. In the example, the acknowledgement ACK(7) of the PDUs up to number 6 is delayed by a delay DEL1, resulting in delayed clocking of new PDUs from the transmitter. For the same purpose, also acknowledgement ACK(10) for the data packets up to 9 is delayed by a delay DEL2. This results also in less PDUs being sent. When the conditioning criterion is again met, the delay of the acknowledgements is reduced or omitted.

Figure 5:
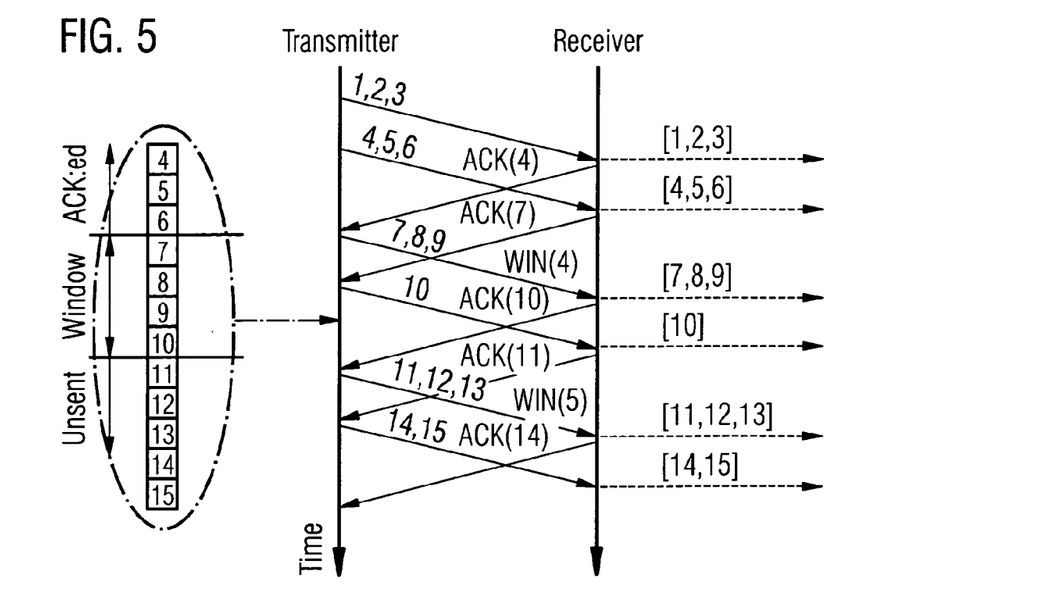
FIG. 5 shows a traffic conditioning in a third embodiment of the proposed method

In a still further embodiment, the size of the transmitter window is reduced due to a violation of a conditioning criterion as illustrated in FIG. 5. Reducing the window size to a smaller value also enforces that less data can be transmitted by the transmitter. Like in the preceding examples, the receiver determines the data rate of received data packets. After receiving a second burst of 3 PDUs, the receiver considers the traffic conditioning criterion as being violated, and sends a message WIN(4) to the transmitter to reduce the size of the transmitter window. In the example, the window size is reduced from 6 to 4 PDUs after reception of PDUs [4,5,6]. Due to the still unacknowledged data packets in flight, the cumulative acknowledgement ACK(7) of the three PDUs [4,5,6] only results in the transmission of the single new PDU 10. At reception of PDU 10, the receiver determines that the adherence to the conditioning criterion is improved. Correspondingly, message WIN(5) is sent to enlarge the size of the transmitter window by one PDU to five. As a result, the cumulative acknowledgement ACK(11) of PDU 10 triggers the transmission of two new PDUs.

While the above embodiments have been described separately, implementations could also include the functionality of a plurality or all of the embodiments. For example, delaying an acknowledgment is a simple and effective way of reducing the data rate but an excessive delay may trigger an unwanted retransmission of the corresponding data packet. Thus a receiver may initially control a conditioning criterion by sending partial acknowledgements or delaying acknowledgements but may then reduce the size of the transmitter window if the initial control method could cause undesired results like unnecessary retransmissions.

In all embodiments, different algorithms are conceivable to reduce the restrictions on the transmission if the conditioning criterion is again met. For example, it is possible to return to the original transmission parameters again if all conditioning criteria are met, i.e. sending again all responses immediately after reception of data packets or reverting the size of the transmitter window to the original value. Alternatively, restrictions may be reduced stepwise, e.g. the delay may be decreased stepwise, the number of data packets in a cumulative acknowledgement may be increased stepwise or the size of the transmitter window may be increased stepwise. The amount of the stepwise adaptations may depend on the determined value relating to the conditioning criterion, for example the delay of a response may be reduced by half if the present data rate is below the MBR and the delay may be deleted if the present data rate is below half of the MBR.

If the packet size is constant in the above examples, the checking of the bit rate against the traffic conditioning criterion of a maximum data rate or the parameters of a token bucket corresponds to counting the number of PDUs per interval of time under consideration of the packet size. However, if the packet sizes vary, the control algorithm requires an information of the respective packet sizes which can be provided for example by the radio link control instance of the radio link over which the packets are transmitted. In this case, individual packet sizes are considered in the comparison with the conditioning criterion of a bit-rate or the fill level, i.e. the amount of traffic the data packets carry.

An advantage of all embodiments is that the described solution enables traffic conditioning per flow or logical channel in contrast to a conditioning per user equipment if one radio link control instance exists per logical channel. This is for example the case in UMTS radio access systems. The proposed method can be applied independently for each of the RLC instances. In this way, a traffic conditioning per logical channel and thus per flow can be achieved.

Figure 6:
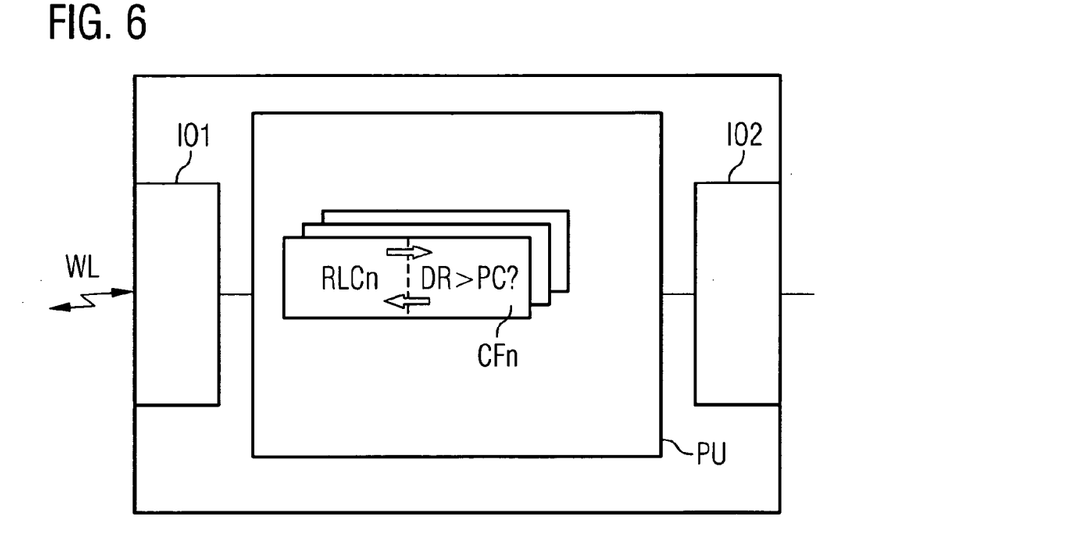
FIG. 6 shows a receiver embodying the proposed method

FIG. 6 shows a receiver adapted to the above method, which can for example be a Node B or an RNC of a UTRAN. The receiver comprises a first input-output unit 101 for communication with user equipments over wireless links WL and a second input-output unit 102 for communication with further nodes in a communication system, for example with an RNC or an SGSN. A processing unit PU connected to the input-output units processes data packets.

The processing unit comprises a plurality of radio link control instances RLCn, one for each logical channel, with associated control functions CFn. The radio link control instances RLCn are adapted to control the transmission of RLC PDUs over the wireless link via the input-output unit 101 and send corresponding control messages, for example acknowledgements for received data packets. The control function CFn is adapted to obtain at least one conditioning criterion PC for the data flow sent over the radio link control instance RLCn, e.g. a maximum bit rate. The conditioning criterion can for example be transmitted to the control function when the radio link is configured and the control instance is set up. The control function determines also the present data rate DR of packets received by the associated radio link control instance as indicated by the upper arrow between the radio link control instance and the control function. The data rate is compared to the conditioning criterion PC. If the data rate exceeds the maximum bit rate, the control function initiates a modification of the control messages as indicated by the lower arrow.

It should be noted that FIG. 6 omits a multitude of elements in the receiver for clarity. For example, underlying layers in a protocol stack may process and forward the data packets between the input-output units and the RLC instances. Control units are typically adapted to coordinate and configure the RLC instances.

Figure 7:
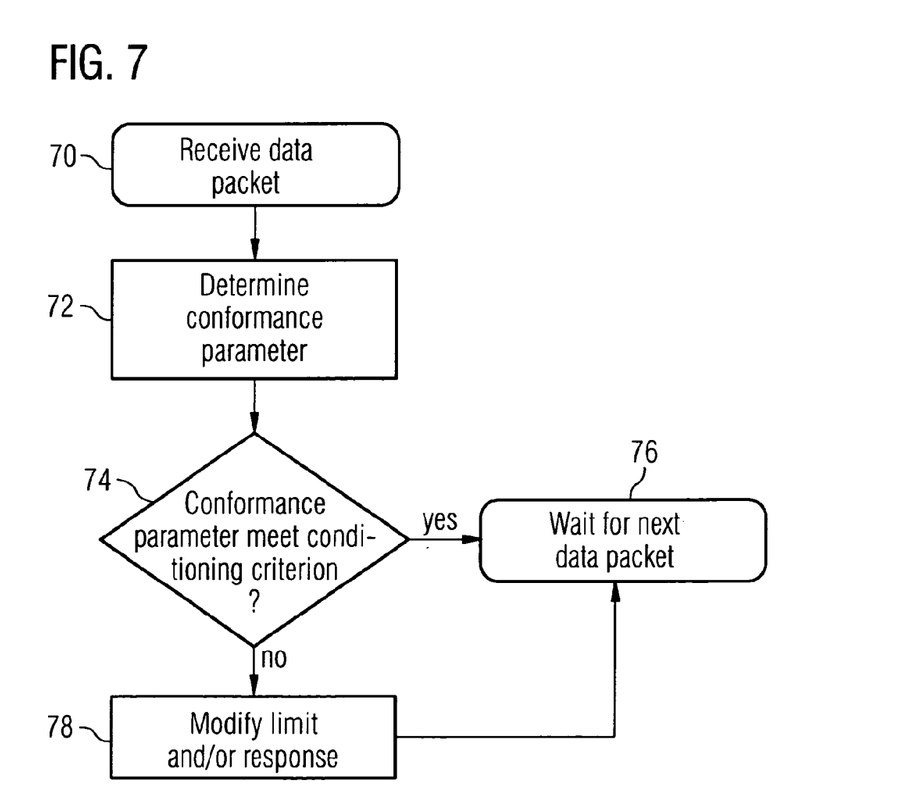
FIG. 7 shows a flow chart of the proposed method

The basic procedure executed by the receiver in the method for controlling the conformance of a data flow to a traffic definition is shown in the flow chart of FIG. 7. In an initial waiting step 70, the receiver waits for data packets transporting the data flow and sent from the transmitter to the receiver. After a data packet is received, the receiver determines in step 72 a conformance parameter for the received data packet. The conformance parameter will often be based also on prior data packets of the same flow, e.g. if it is an average data rate or a bucket fill level of a token-bucket. If the receiver processes different flows, the conformance parameter is generally determined for the flow to which the packet belongs.

In comparison 74, the receiver compares the conformance parameter to a conditioning criterion for the data flow, which is associated with the traffic definition for the flow. If the conformance parameter meets the conditioning criterion, it waits for the next data packet in waiting state 76. If the conformance parameter does not meet the conditioning criterion, the receiver modifies the limit of outstanding data packets and/or the sending of the responses for controlling the number of transmitted data packets. It then also enters the waiting state.

The sending of the responses identifying received data packets to the transmitter is not shown in the figure because different implementations are possible in which responses are sent for example for each packet, in regular intervals of time or after a certain number of packets is received. However, in any of these implementations the sending of the responses can be modified as described before.

The above embodiments admirably achieve the objects of the invention. However, it will be appreciated that departures can be made by those skilled in the art without departing from the scope of the invention which is limited only by the claims. In particular, although the invention has been described in the context of UTRAN and enhanced UTRAN, including the Long Term Evolution (LTE) of the UTRAN, it is not limited to this case but it is applicable to any communication system which uses a window-based link-layer protocol, for example in further wireless systems such as GSM/EDGE, CDMA2000 and WiMAX.

The invention claimed is:

1. A method for controlling conformance of a data flow in a communication system to a traffic definition associated with a specified quality of service, the communication system having a transmitter and a receiver, the method comprising the steps of:
   providing a data flow consisting of data units of an upper layer in a protocol stack and a traffic definition for said data flow;
   transporting the data flow by data packets of an underlying layer in the protocol stack sent from the transmitter to the receiver;
   sending, by the receiver, responses identifying received data packets to the transmitter for the data packets transporting the data flow;
   the transmitter utilizing a control function of the underlying layer for controlling the number of sent data packets for which no response is received, according to a limit for the number of outstanding data packets;
   obtaining a predefined conditioning criterion for the data flow, the conditioning criterion being associated with the traffic definition,
   determining, at the receiver, a conformance parameter for the received data packets transporting the data flow, wherein
      if the conditioning criterion is fulfilled according to the determined conformance parameter, the receiver sending acknowledgments for all received data packets, and if the conditioning criterion is violated according to the determined conformance parameter, the receiver sending acknowledgments for only a part of the received data packets for controlling the number of transmitted data packets.

2. The method according to claim 1, comprising sending a message from the receiver to the transmitter for adapting the limit.

3. The method according to claim 1, comprising adapting a delay before sending a response.

4. The method according to claim 1, wherein the responses are acknowledgements.

5. The method according to claim 1, wherein the responses are adapted to identify a plurality of data packets and said step of modifying comprises an adaptation of the number of data packets identified in a response.

6. The method according to claim 1, wherein the conditioning criterion is a limit for a data rate and the conformance parameter is a measured data rate.

7. The method according to claim 1, wherein the conditioning criteria are the size and token rate of a token bucket and the conformance parameter is the fill level of the token bucket.

8. The method according to claim 1, wherein the data packets are data packets of a link layer on a communication link between the transmitter and the receiver.

9. The method according to claim 1, wherein said transmitter is a user equipment and said receiver is a base station of a mobile communication system.

10. The method according to claim 1, wherein a plurality of data flows is sent between the transmitter and the receiver and the steps of obtaining the conditioning criterion, determining the data rate and modifying are performed for each data flow.

11. The method according to claim 1, wherein the size of the data packets is variable and said step of modifying is performed according to the size of the data packets.

12. A receiver for controlling conformance of a data flow in a communication system to a traffic definition associated with a specified quality of service, wherein the data flow consists of data units of an upper layer in a protocol stack and data packets transporting the data flow are data packets of an underlying layer in the protocol stack, the receiver comprising:

an input unit to receive the data packets transporting the data flow from a transmitter;

an output unit adapted to send responses identifying received data packets to the transmitter; and a processing unit adapted to control the responses sent by the output unit and to obtain a predefined conditioning criterion for the data flow, the conditioning criterion being associated with the traffic definition, the processing unit further comprising a determining function for determining a conformance parameter for the received data packets transporting the data flow;

a control function for the underlying layer for controlling the number of sent data packets for which no response is received; and a setting function for modifying a limit for a number of outstanding data packets or the sending of the responses according to the conditioning criterion and the determined conformance parameter for controlling the number of transmitted data packets obtaining a conditioning criterion for the data flow, the conditioning criterion being associated with the traffic definition, wherein if the conditioning criterion is fulfilled according to the determined conformance parameter, the receiver sending acknowledgments for all received data packets, and if the conditioning criterion is violated according to the conformance parameter, the receiver sending acknowledgments for only a part of the received data packets.

13. The receiver according to claim 12, wherein the setting function of the processing unit further comprises means for sending a message from the receiver to the transmitter for adapting the limit.

14. The receiver according to claim 12, wherein the setting function of the processing unit further comprises means for adapting a delay before sending a response.

15. The receiver according to claim 12, wherein the responses are acknowledgements.

16. The receiver according to claim 12, further comprising adaptation means for adapting the responses to identify a plurality of data packets and for adapting the number of data packets identified in a response.

17. The receiver according to claim 12, wherein the conditioning criterion is a limit for a data rate and the conformance parameter is a measured data rate.

18. The receiver according to claim 12, wherein the conditioning criteria are the size and token rate of a token bucket and the conformance parameter is the fill level of the token bucket.

19. The receiver according to claim 12, wherein the data packets are data packets of a link layer on a communication link between the transmitter and the receiver.

20. The receiver according to claim 12, wherein said receiver is a base station of a mobile communication system.

21. The receiver according to claim 12, wherein a plurality of data flows being sent between the transmitter and the receiver the receiver having means for obtaining the conditioning criterion, determining the data rate and modifying each data flow.

* * * * *

UNITED STATES PATENT AND TRADEMARK OFFICE
CERTIFICATE OF CORRECTION

PATENT NO. : 8,477,608 B2
APPLICATION NO. : 12/447109
DATED : July 2, 2013
INVENTOR(S) : Ludwig et al.

It is certified that error appears in the above-identified patent and that said Letters Patent is hereby corrected as shown below:

In the Specification

Column 4, line 67, delete "applicable" and insert therefor -- applicable. --

Column 5, line 4, delete "method" and insert therefor -- method. --

Column 5, line 6, delete "method" and insert therefor -- method. --

Column 5, line 8, delete "method" and insert therefor -- method. --

Column 5, line 9, delete "method" and insert therefor -- method. --

Column 5, line 10, delete "method" and insert therefor -- method. --

Column 8, line 65, delete "(PDU)" and insert therefor -- (PDUs) --

Column 11, line 33, delete "unit 101" and insert therefor -- unit IO1 --

Column 11, line 35, delete "unit 102" and insert therefor -- unit IO1 --

Column 11, line 44, delete "unit 101" and insert therefor -- unit IO1 --

Signed and Sealed this
Third Day of December, 2013

Margaret A. Focarino
*Commissioner for Patents of the United States Patent and Trademark Office*